Figure 1:
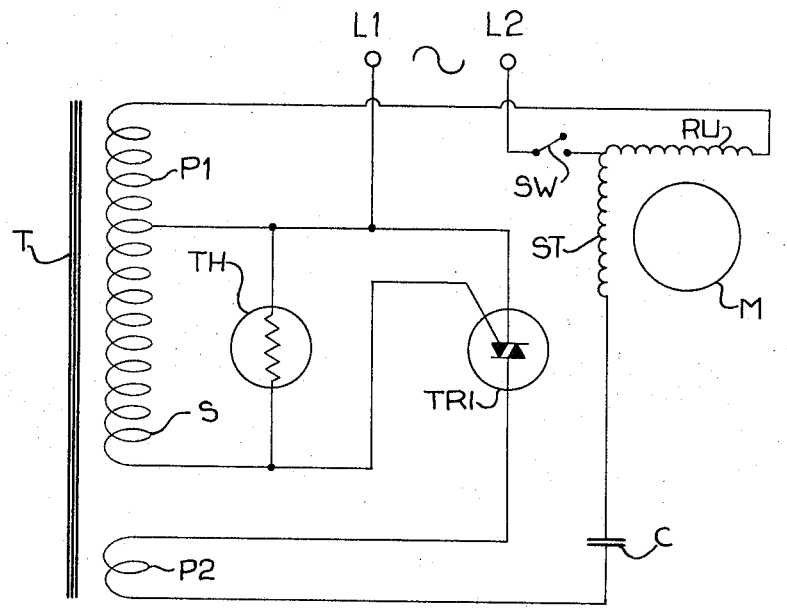

United States Patent

Ramirez

[15] 3,667,017
[45] May 30, 1972

[54] STARTER DEVICE FOR SINGLE PHASE AC MOTORS

[72] Inventor: Antonio Ramirez, 5885 Park Avenue, Montreal, 152 Quebec, Canada

[22] Filed: Apr. 26, 1971

[21] Appl. No.: 137,199

[30] Foreign Application Priority Data

Jan. 13, 1971 Canada....................................102099

[52] U.S. Cl..........................................318/221 E, 318/227
[51] Int. Cl..........................................................H02p 1/44
[58] Field of Search...............318/220 R, 221 R, 221 E, 227

[56] References Cited

UNITED STATES PATENTS 3,376,484 4/1968 Lewus................................318/221 E
3,573,579 4/1971 Lewus................................318/221 E Primary Examiner—Gene Z. Rubinson
Attorney—Raymond A. Robic

[57] ABSTRACT

A starter device for a single phase A.C. motor having a main winding and a starting winding adapted for connection to a single phase A.C. source. The starter device includes a semiconductor switching device having a control electrode and a transconductive path, and a transformer having a first and a second primary windings arranged to generate opposite fluxes in the transformer core, and a secondary winding. The starter device includes a circuit for connecting the first primary winding in series with the main winding of the motor and another circuit for connecting the second primary winding in series with the transconductive path of the switching device and with the starting winding of the motor. The control electrode of the switching device is connected to the secondary winding of the transformer whereby the voltage induced in the secondary winding by the initial inrush of current flowing through the first primary winding upon starting of the motor will render the switching device conductive to permit energization of the starting winding of the motor to start the same. The flux produced by the second primary winding shortly after initiation of conduction in the switching device will oppose the flux created by the first primary winding and so reduce the voltage induced in the secondary winding to stop conduction through the switching device and thus disconnect the starting winding of the motor.

4 Claims, 2 Drawing Figures

INVENTOR
Antonio RAMIREZ
BY
ATTORNEY

STARTER DEVICE FOR SINGLE PHASE AC MOTORS

The invention relates to a starter device for a single phase A.C motor.

Conventional single phase A.C. motors normally include two stator windings, a running winding which operates the motor and a starting winding which is used to start the motor. The starting winding is needed because the running winding does not provide any torque until the rotor of the motor rotates. It is therefore known practice to energize both windings until the desired speed is reached and then to disconnect the starting winding.

The starter devices of the prior art included centrifugal switches or relays which were subject to arcing and wear of moving parts. Such electromechanical devices were bulky and, furthermore, could not be used in locations where explosions could occur because of arcing problems. In addition, they had to be adjusted for each motor they were used with.

Recently, the electromechanical devices have been replaced by semi-conductor switches. Commonly, one or more semi-conductor switches are connected in series with the starting winding of the motor and are opened or closed depending upon a control voltage derived from a current sensing device serially connected with the main winding and responsive to the decrease of the current in the running winding of the motor as speed increases. Such devices are much more compact than the electromechanical devices and are not subject to arcing and wear since they do not have moving parts. They may also be encapsulated and thus protected against vibrations, dust, humidity, etc.

However, it has been found that the current sensing devices of the above-mentioned semi-conductor switching devices could not be used with all sizes of motors. In fact, in the more common range of 1/6 to 1 HP motors, it was found that a great number of sensing devices were required because of the variations in the current to be sensed.

It is therefore the main object of the invention to provide a starter device for A.C. motors which may be utilized with a wide range of motors having different horsepower ratings and yet provide all the advantages of the semi-conductor switching devices.

The starter device, in accordance with the invention, includes a semi-conductor switching device having a control electrode and a transconductive path, and a transformer having a first and a second primary windings arranged to generate opposite fluxes in the transformer core, and a secondary winding. The starter device includes a circuit for connecting the first primary winding in series with the main winding of the motor and a second circuit for connecting the second primary winding in series with the transconductive path of the switching device and with the starting winding of the motor. The control electrode of the switching device is connected to the secondary winding of the transformer, whereby the voltage induced in the secondary winding by the initial inrush of current through the first primary winding upon starting of the motor will render the switching device conductive to permit energization of the starting winding of the motor to start the same. The flux produced by the second primary winding, shortly after initiation of the conduction of the switching device, will oppose the flux created by the first primary winding and reduce the voltage induced in the secondary winding to stop conduction through the switching device and thus disconnect the starting winding of the motor.

In addition, a thermistor is connected across the secondary winding for absorbing the voltage surges induced in the secondary winding of the transformer due to sudden overloads of the motor during operation causing corresponding increases of the current through the first primary winding.

In a second embodiment of the invention, the thermistor is replaced by a potentiometer which also permit to adjust at will the potential to be applied to the control electrode of the switching device thus extending the use of the starter device to a wider range of motor voltages, speeds and powers.

Figure 2:
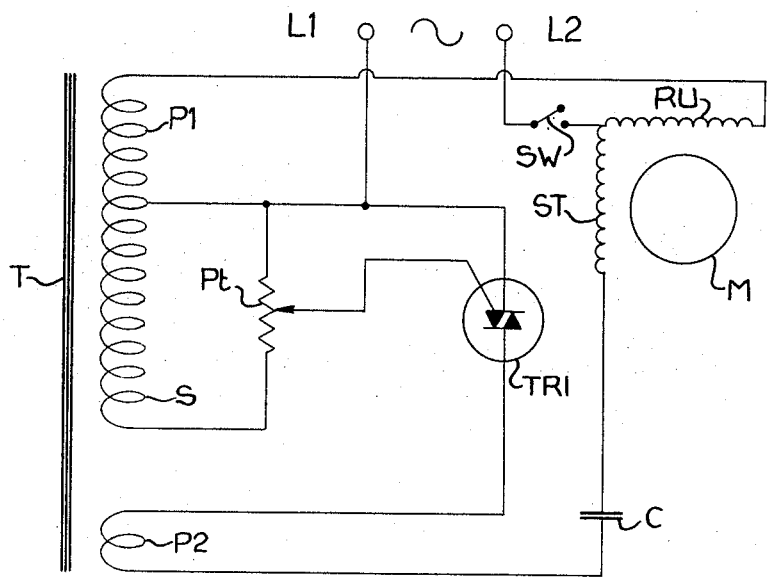

The invention will now be disclosed in more detail with reference to preferred embodiments thereof and to the accompanying drawings in which:

FIG. 1 illustrates a first embodiment of the invention; and
FIG. 2 illustrates a second embodiment of the invention.

Referring to FIG. 1, there is shown a starter device in accordance with the invention and including a transformer T having two primary windings P1 and P2 wound in opposite direction on the transformer core, and a secondary winding S. The first primary winding P1 is connected in series with the running winding RU of the motor M across terminals L1 and L2 of a suitable A.C. source through conventional manual switch SW. The second primary winding P2 of the motor is connected to terminals L1 and L2 through the transconductive path of a semi-conductor switching device TRI which may advantageously be of the TRIAC type, in series with the starting winding ST and the phasing capacitor C of the motor.

The secondary winding S of the transformer has one terminal connected to the control electrode of the semi-conductors switching device TRI and the other to the common terminal L1 of the source. A thermistor TH is connected across secondary winding S of the transformer.

The operation of the starter device in accordance with the invention is as follows:

Upon closure of switch SW, current starts to flow through the primary winding P1 of transformer T and through the running winding RU of the motor. The initial inrush of current through the running winding of the motor will induce a voltage in secondary winding S of the transformer T and such voltage will be applied to the control electrode of semi-conductor switching device TRI to render the switching device conductive.

The conduction of switching device TRI will cause current to flow through the second primary winding P2 of transformer T and through the starting winding ST and phasing capacitor C of the motor to start the same. Because winding P2 is wound in opposite direction to winding P1, the flux of winding P2 will cancel a portion of the flux of winding P1 and thus cause a decrease of the voltage across secondary winding S. The number of turns of winding P2 is designed in such a way that when the motor is up to its normal speed, the flux of P2 will decrease the flux of winding P1 so that the voltage induced in the secondary winding S will not be sufficient to maintain conduction through switching device TRI. The starting winding of the motor will thus be disconnected.

Thermistor TH is connected across the secondary winding S to absorb the voltage surges induced into the secondary winding due to sudden overload currents flowing through the running winding of the motor M due to sudden changes in the load applied to the motor.

Because the thermistor TH has a predetermined fixed characteristic, it limits the range of use of the starter device to a predetermined range of motor voltages, speeds and powers. In the embodiment of FIG. 2 the range of use of the starter device has been further extended by replacing the thermistor TH of FIG. 1 by a potentiometer Pt for absorbing the voltage surges induced in the secondary winding S and for permitting adjustment of the voltage applied to the triac. The other element of the starter device of FIG. 2 are identical to the ones of FIG. 1 and have been illustrated by the same reference characters. By using a potentiometer instead of a thermistor the opening of the triac becomes adjustable at will for suiting various types of motors, thus widening the range of use of the starter device in accordance with the invention.

The advantage of the starter device of the invention is that it is substantially independent of the nominal current and thus the horsepower rating of the motor and that, consequently, it may be used with a wide range of motors. In fact, applicant has found that about three models of starters will be sufficient to start a group of motors ranging from 1/6 to 1 HP. Indeed, the starter device of the invention is not responsive to the difference between the starting and the running currents of the motor as it was the case for the devices of the prior art. On the contrary, the starter device in accordance with the invention is responsive to the difference between the current flowing through the running winding and the starting winding of the motor, which difference of current does not vary substantially for a wide range of motors.

Although the invention has been disclosed with reference to a preferred embodiment of the invention, it is to be understood that the arrangement of the windings of the transformer and of the switching device may be varied and that the invention is meant to cover such variations.

I claim:

1. A starter device for a single phase A.C motor having a main winding and a starting winding adapted for connection to a single phase A.C. source, comprising:
   a. a semi-conductor switching device having a control electrode and a transconductive path;
   b. a transformer having a first and a second primary windings arranged to generate opposite fluxes in the transformer core, and a secondary winding;
   c. circuit means for connecting said first primary winding in series with the main winding of the motor;
   d. circuit means for connecting said second primary winding in series with the transconductive path of the switching device and with the starting of the motor; and
   e. means for connecting the control electrode of said switching device to the secondary winding of said transformer, whereby the voltage induced in said secondary winding by the initial inrush of current through said first primary winding upon starting of the motor will render said switching device conductive to permit energization of the starting winding of the motor to start the motor, whereas the flux produced by said second primary winding shortly after initiation of the conduction of said switching device will oppose the flux created by said primary winding and so reduce the voltage induced in the secondary winding to stop conduction through the switching device and thus disconnect the starting winding of the motor.

2. A starter device as defined in claim 1, further comprising a thermistor connected across said secondary winding for absorbing the voltage surges induced in the secondary winding of the transformer due to sudden overloads on the motor during operation causing corresponding increases of the current through the first primary winding.

3. A starter device as defined in claim 1, wherein said switching device is a triac.

4. A starter device as defined in claim 1, wherein a potentiometer is connected across said secondary winding, said potentiometer having a variable tap connected to said control electrode for varying the voltage applied to said switching device and for absorbing the voltage surges induced in the secondary winding of the transformer due to sudden overloads on the motor during operation causing corresponding increases of the current through the first primary winding.

* * * * *